Dec. 15, 1931.   G. W. PAULSON   1,836,495
LOCATOR FOR LOST SHIPS
Filed March 30, 1931   4 Sheets-Sheet 1

George W. Paulson
Inventor
Attorney

Dec. 15, 1931.   G. W. PAULSON   1,836,495
LOCATOR FOR LOST SHIPS
Filed March 30, 1931    4 Sheets-Sheet 2
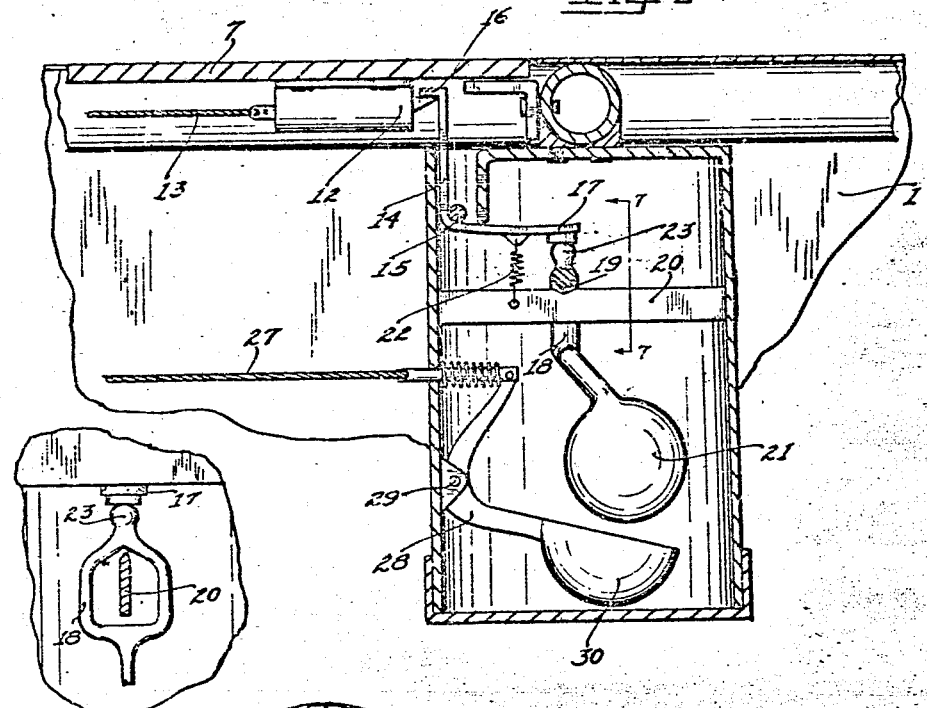
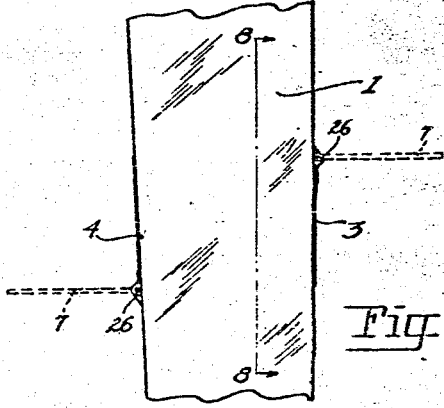
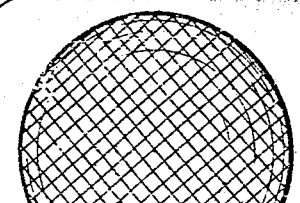
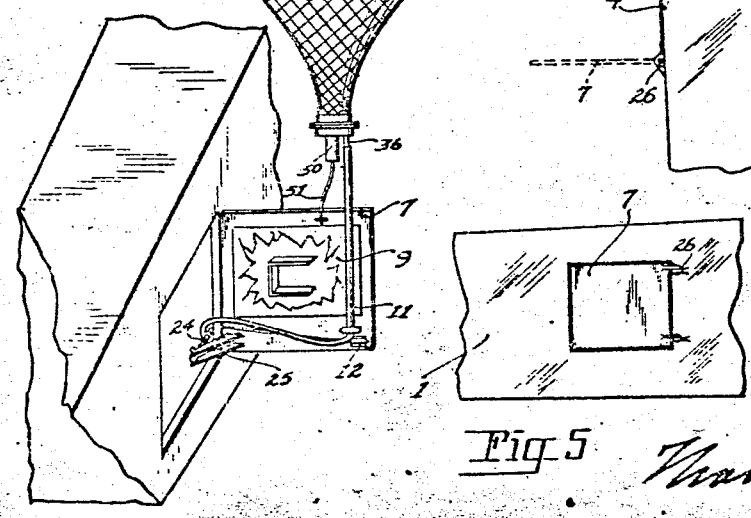
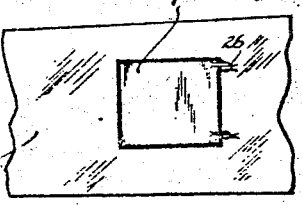
George W. Paulson
Inventor
Attorney Dec. 15, 1931.  G. W. PAULSON  1,836,495
LOCATOR FOR LOST SHIPS
Filed March 30, 1931  4 Sheets-Sheet 3

George W. Paulson
Inventor
Attorney

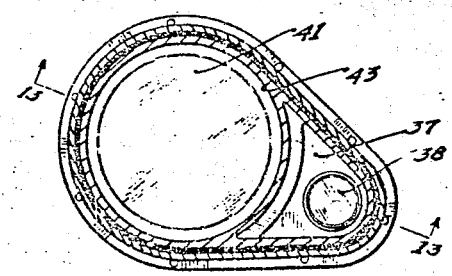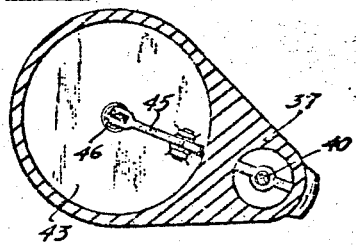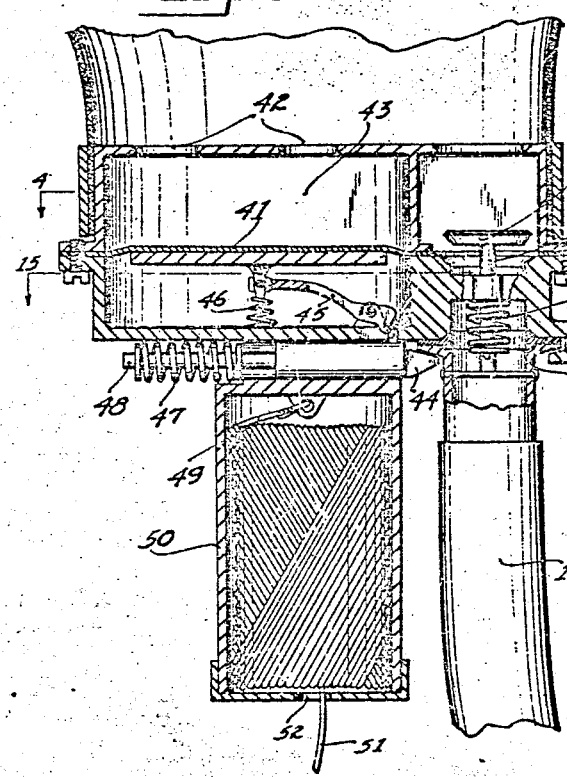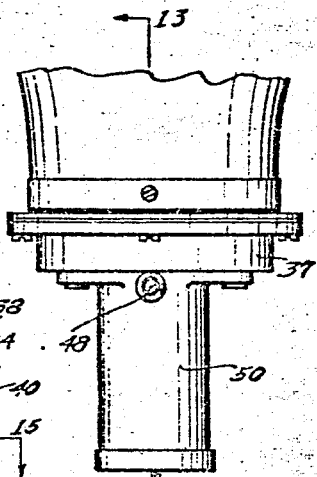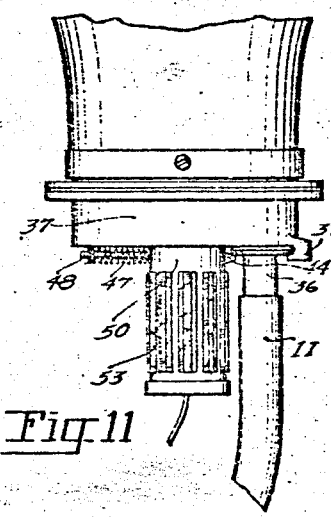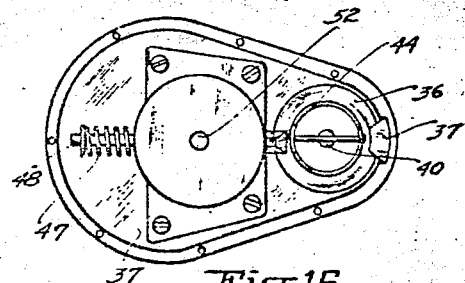

Patented Dec. 15, 1931

1,836,495

UNITED STATES PATENT OFFICE

GEORGE W. PAULSON, OF PORTLAND, OREGON, ASSIGNOR, BY DIRECT AND MESNE ASSIGNMENTS, TO STEERING GEAR MANUFACTURING CO., OF PORTLAND, OREGON, A CORPORATION OF OREGON

LOCATOR FOR LOST SHIPS

Application filed March 30, 1931. Serial No. 526,356.

My invention is intended for use upon ships for indicating the position of the hull after an accident, or when a premature landing has been made that produced a shock.

The invention is primarily adapted for use in conjunction with airships. It is well adapted for use upon aeroplanes but I do not wish to be limited in the application of my device to airships as the same is susceptible for use upon submarines and other water craft.

The invention in its preferred embodiment is adapted for being carried within a specially prepared compartment, at one, or more locations upon the ship, in which an inflatable member is carried within the compartment where it is partially, or wholly deflated. The inflatable member has associated and intercommunicating therewith a tank, or bottle filled with a compressible, compressed fluid normally lighter than air from which the fluid will flow into the inflatable member when automatically released. The inflatable member is normally held locked to the hulk of the ship which is adapted for being released therefrom when a predetermined pressure is developed within the inflatable member.

A tag line is disposed within, or adjacent the compartment which is adapted for being unreeled, or unwound as the buoyancy of the inflatable member carries the same from placement, to thereby maintain the inflated member secured to the hulk, after being inflated and released.

The object of my invention is to indicate the position of a lost vessel by a buoyant member secured thereto.

A further object of my invention consists in providing suitable mechanisms that will automatically be inflated and released when an undue shock is imparted to the ship, as by contact, or otherwise.

A still further object of my invention consists in providing a suitable mechanism that may be manually, or automatically released, to permit a buoyant member to rise from the hulk, or ship to indicate the location of the ship thereby.

Still further objects of my invention consists in providing a mechanism that may be locked in place, manually by the pilot, or other attendant when a forced landing is to be made that would otherwise impart sufficient shock to the whole ship that would automatically release the buoyant member and which may be prevented by the manual operating of the mechanisms by the pilot, or attendant of the ship.

With these and incidental objects in view, the invention consists in certain novel features of construction and combination of parts, the essential elements of which are hereinafter shown with reference to the drawings which accompany and form a part of this specification.

In the drawings:

Fig. 3 is a perspective, end view of a part of a fuselage of an aeroplane illustrating a door hingedly secured thereto and to which is attached a buoyant member, being inflated.

Fig. 4 is a top, plan view of a fuselage, illustrating a door, as closed, upon the oppositely disposed sides of the fuselage.

Fig. 5 is a side view of the mechanism illustrated in Fig. 4, illustrating the door of the compartment in which the inflated member is disposed, as being closed.

Fig. 6 is a fragmentary, sectional, top, plan view of the operating mechanism associated with the door for automatically releasing the same when a shock occurs.

Fig. 7 is a fragmentary, sectional, end view of a part of the mechanism illustrated in Fig. 6, the same being taken on line 7—7 of Fig. 6, looking in the direction indicated.

Fig. 11 is a fragmentary, side view of the base end of the captive balloon, illustrating the same as being attached to the inflating hose; in this view is also shown reflecting elements being secured to the base adapted for being illuminated, as by sunlight, to afford greater visibility to the device.

Fig. 12 is a side view of the mechanism illustrated in Fig. 11 and illustrating the same as being released from the inflating hose.

Figures 1, 2:
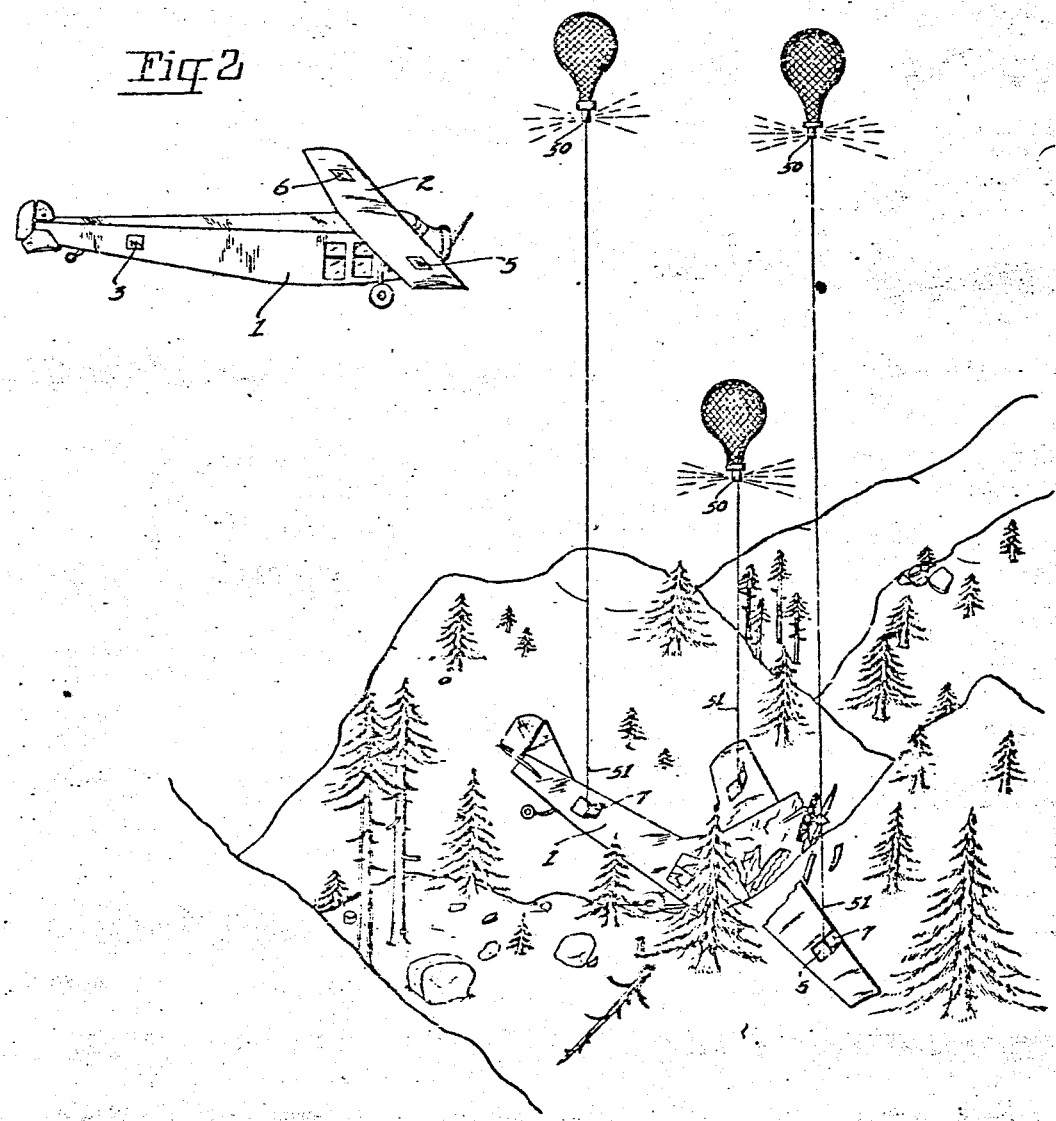
Fig. 1 is a bird's eye of the landscape of rough terrain upon which a broken airship is shown in perspective view and illustrating one, or more captive balloons being adapted thereto and having been released therefrom.
Fig. 2 is a perspective view of an airship in flight and illustrating three hatches, shown closed, that are adapted for maintaining captive balloons therein and to the door of which the deflated skin of the balloon is, or may be attached.

Fig. 13 is a sectional, side view of the mechanism illustrated in Figs. 12 and 14, the same being taken on line 13—13 of Figs. 12 and 14, looking in the direction indicated.

Fig. 14 is a sectional, end view of the mechanism illustrated in Fig. 13, the same being taken on line 14—14 of Fig. 13, looking in the direction indicated.

Fig. 15 is a sectional, end view of the mechanism illustrated in Fig. 13, the same being taken on line 15—15 of Fig. 13, looking in the direction indicated.

Fig. 16 is an inverted plan view of the mechanism illustrated in Fig. 13.

Like reference characters refer to like parts throughout the several views.

I have here shown my device as being used upon an aeroplane but I do not wish to be limited in the application of my device to aeroplanes, as the same may be used upon hydroplanes, balloons, submarines and water craft.

Where the same is to be used upon water craft, the buoyant member will be required to be made of waterproofed material, or material that will be impervious to water under normal pressure. Where the buoyant member is to be released while the ship is submerged in the water the buoyant member will be made of heavy material.

In the drawings. 1 represents the fuselage and 2 represents the wing structure. I have shown compartments 3 and 4 disposed upon oppositely disposed sides of the fuselage and compartments 5 and 6 disposed within the wing structure of the plane. The purpose and object in providing a plurality of compartments upon oppositely disposed sides of the ship and at different locations, is to insure the release of captive balloon from at least one, or more compartments, irrespective of the position in which the wrecked hulk may lie. Each of the compartments has a hinged door 7 hingedly secured to act as a closure for the compartment.

A deflated balloon carcass 8 is foldably secured to the door and is preferably sealed relative to the door by a fragile covering 9. The covering may be easily destroyed by the enlargement of the balloon caused by inflation.

One or more tanks 10 are remotely disposed within the ship and a flexible communicating conductor 11 connects the tank 10 with the deflated balloon carcass. The tank 10 is filled with a compressible fluid, when released and under normal pressure, that is lighter than air, and the same remains disposed within the tank and under compression until the door 7, to which the balloon carcass is secured, is opened. The door, to which the balloon is attached, is normally maintained closed through the action of a locking latch 12. The locking latch 12 is adapted for being manually released through the action of a pull cord 13 which terminates upon its oppositely disposed end in the cock pit, or adjacent the position upon which the operator of the vessel is normally positioned during the flight, or travel of the ship.

The locking latch may be automatically released, by the mechanism illustrated in Fig. 6. A bell crank 14 is rockably disposed about a pin 15. A foot 16 is disposed upon one end of the bell crank that normally engages the locking end of the locking latch 12. The oppositely disposed end 17 of the bell crank is in normal engagement with a pendulum 18. The pendulum is pivotally disposed about a knife edge 19 that rests and is tiltably disposed upon a supporting bar 20.

The pendulum 18 has a counterweighted end 21 and in the normal flight of the vessel, the counterweighted pendulum is normally maintained in the state of equilibrium relative to the bell crank 17 through the action of the reacting element, as a coil spring 22. When the vessel is unduly shocked, from any cause, the momentum of the counterweighted pendulum 18 causes the contacting knob 23 of the pendulum bar, that engages the underside of the bell crank, to move out of registry with the bell crank, at which time the reacting element 22 causes the bell crank to be partially rotated about the pin 15, at which time the foot 16 disengages from the locking latch 12 and the door of the closure will be opened through the normal action of the reacting element 24, that reacts against an arm 25 secured to the door 7, the door 7 being hingedly secured to the side wall of the ship by a hinge 26.

When the pilot, or operator of the ship, realizes that the ship being piloted by him is to be shocked sufficiently to cause the pendulum to be reacted by the momentum, he may prevent this by the pulling of the cord 27, one end of which terminates within the cock pit, or other convenient location to the operator of the ship.

A bell crank 28 is adapted for being manipulated by the cord 27, the bell crank being pivotally disposed about a supporting pin 29. A cup 30 is disposed upon one end of the bell crank and is adapted to engage with and maintain the counterweight 21 of the pendulum in position to prevent the disengagement of the knob 23 of the pendulum with the bell crank 14.

Figure 8:
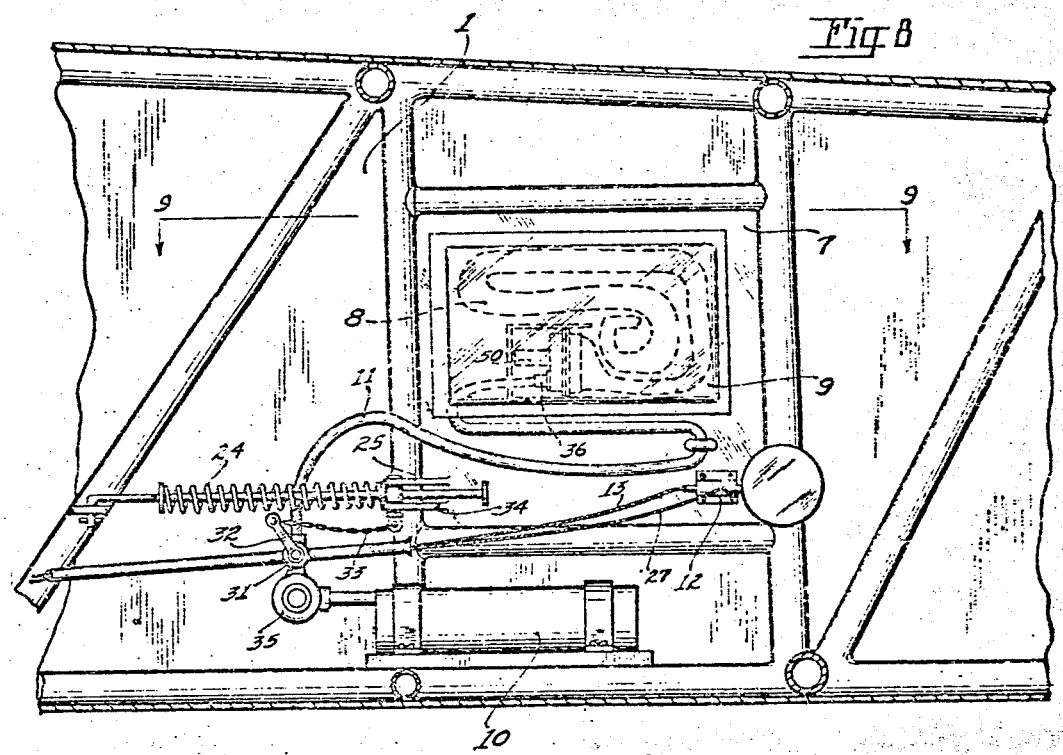
Fig. 8 is a fragmentary, sectional, side view of the fuselage of an aeroplane illustrating a door, the inflatable member, the tank and the associated elements for automatically inflating the captive balloon when the door is opened.
Figure 9:
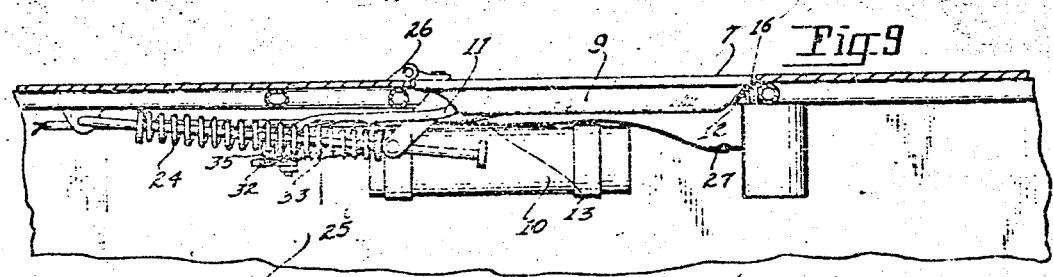
Fig. 9 is a sectional, plan view of the mechanism illustrated in Fig. 8, the same being taken on line 9—9 of Fig. 8, looking in the direction indicated.
Figure 10:
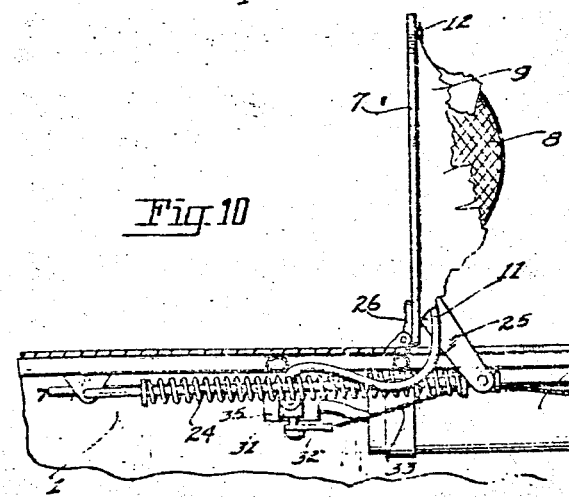
Fig. 10 is a sectional, plan view of the mechanism illustrated in Fig. 9 and illustrating the door in open position.

A valve 31, illustrated in Fig. 8, is disposed within the passageway leading from the tank 10 and a valve stem 32 is secured to the valve. A pull cord, or chain 33 connects the valve stem 32 with the arm 34 secured to the inner side of the door 7 and when the door 7 is opened the valve 31 is opened and the compressed fluid is permitted to flow from the tank 10 into the deflated balloon carcass, secured to the inside of the door 7.

A second expansion valve 35 is disposed between the tank and the valve 31 which limits the amount of pressure that is permitted to flow through the valve 31, and into the balloon. This is of primary importance to prevent the compressible fluid of high pressure being permitted to flow into the balloon which would have a tendency to rupture the same, were the compressible fluid of high pressure permitted to directly enter the balloon structure.

In the early stages of the inflation of the balloon carcass the fragile seal 9 is ruptured, which permits the even inflation of the captive balloon. The head 36 disposed upon the outer end of the conductor 11 is releasably secured to the closure base 37 of the balloon and a valve 38, illustrated in Fig. 13 is held open, so long as the head 36 is in engagement with the base of the captive balloon.

A reacting element, as a coil spring 39 is disposed about the valve stem 40 and when the head 36 is released from the base of the captive balloon, the valve 38 will be seated and the fluid disposed within the balloon will be prevented from escapement therethrough.

A diaphragm 41 is disposed within the base 37 and an intercommunicating passageway 42 permits the compressible fluid being admitted into the balloon for inflation purposes, to pass through the holes into the chamber 43 and to act upon the diaphragm 41. A locking latch 44 is adapted for maintaining the head 36, removably secured to the base of the captive balloon. The locking latch being held in normal engaged positon with the base through the action of a locking trigger 45. A spring 46 maintains the locking trigger in engagement with the locking latch. When a predetermined pressure is developed within the captive balloon the diaphragm is pushed outward and the spring 46 is compressed, at which time the locking trigger is disengaged from the locking latch 44 and a reacting element 47, disposed about the stem 48 of the locking latch, imparts longitudinal movement to the locking latch and the head 36 is disengaged from the base of the captive balloon, at which time the valve 38 will be seated and the buoyant fluid will be maintained within the captive balloon. When the captive balloon is released from the conductor 11 the buoyancy of the balloon will cause the same to rise.

It is important that a tag line 49 be released from a chamber 50 that is secured to the base of the captive balloon, in order that the tag line 49 will be unreeled as the balloon rises. This will prevent the tag line from becoming entangled with the hulk of the ship. The unreeled end 51 of the tag line passes through an opening 52 disposed within the base of the chamber 50 and the tag line is secured to the hulk of the ship. The length of the tag line may be governed to suit the service for which the airship, or submarine is intended for operation. Where an airship is to be operated over relatively rough terrain, a relatively long tag line may be required. When the same is to be operated over the plains, or over relatively even ground, a shorter tag line may be found desirable. It may also be found desirable to place a plurality of crystals 53 within a suitable support adapted to the base of the captive balloon which will be adapted for reflecting sunlight and to call attention to the balloon when the same is raised.

An automatic radio signalling device may also be secured to the balloon that is adapted for being released when the balloon is cut loose, or automatically released from the airship. The radio may be so made as to release a spark that may be picked up by radio operators to call the attention of the operator that a ship carrying the apparatus herein described has been released and that the ship is in trouble. This radio apparatus is not here shown, but any equipment suitable for this purpose may be used.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, in combination with an air ship of a door that is normally closed by a locking latch, a resting element secured to the latch that is stressed when the door is closed, a trigger coacting with the latch for normally maintaining the latch closed, a counterweight coacting with a bell crank for normally maintaining the trigger in locked engagement with the latch, said counterweight adapted for being actuated when the ship is shocked, as by a sudden landing, an inflatable element secured to the door, a tank remotely disposed within the ship and a communicating passageway disposed between the inflatable element and the tank, a lighter than air compressed fluid disposed within the tank, a door disposed as a closure for a chamber in which a captive balloon is located a hollow conductor leading from the tank to the inflatable element, means for opening the valve when the door is opened, means for releasing the inflated element from the door when a predetermined pressure is reached within the inflated element and a tag line connecting the inflated element with the hulk of the ship and adapted for being unreeled when the inflated element rises.

2. In a device of the class described, in combination with a compartment of a ship, of a deflated balloon disposed within the compartment, and releasably attached thereto, means associated with the deflated balloon adapted for inflating the same when the ship is unduly shocked in the interrupting of the ship in its normal direct line of travel, means for releasing the balloon when a predetermined inflating pressure is reached, and a reeled tag line connecting the balloon to the ship and adapted for being unreeled and for maintaining the balloon captive and in spaced relation with the ship as the balloon rises.

3. In a device of the class described, in combination with a compartment of a ship, of a captive deflated balloon selective means for releasing the balloon from the ship when inflated, means for automatically inflating the balloon with a lighter than air fluid when an abnormal shock is imparted to the ship, automatic means for releasing the inflated balloon when a predetermined inflating pressure is reached within the balloon, and a tag line connecting the balloon with the ship and adapted for being unreeled, through the buoyant action of the balloon, when the balloon is released from engagement with the ship.

4. In a device of the class described, in combination with one or more compartments of a ship, of a deflated captive balloon disposed within each compartment, a communicating hollow conductor connecting the balloon with a source of compressed fluid that is normally lighter than air when under normal atmospheric pressure, automatic means for releasing the compressed fluid from its source through the conductor and into the balloon when the ship is unduly shocked, automatic means for releasing the balloon from captivity relative to its normal place of attachment within the compartment when a predetermined pressure is reached within the balloon, and means adapted for maintaining the balloon captive and in spaced relation with the ship, when the balloon rises through its buoyant action.

5. In a device of the class described, in combination with a ship having one or more balloon retaining compartments disposed within the ship, a deflated balloon disposed within each compartment and releasably attached to the ship, a source of supply of inflating material held under pressure disposed within the ship, a conductor leading from the compressed fluid container to the base of each of the balloons means for permitting the compressed fluid to flow through the conductor and into the balloon when the ship is unduly shocked in its normal passage, means for releasing the balloon from its compartment when a predetermined inflating pressure is reached within the balloon, and means for maintaining the balloon captive and in spaced relation with the abandoned ship.

6. In a device of the class described, in combination with a ship having a plurality of balloon retaining compartments, a balloon releasably disposed within each of the compartments, means for inflating each of the balloons from a source of compressed fluid remotely disposed from the balloon and within the ship that is lighter than air when under normal pressure, automatic means for releasing the balloon from the compartment when a predetermined inflating pressure is reached within the balloon and means for maintaining the balloon captive and in spaced relation with the ship after the same has been released from the compartment.

7. In a device of the class described, the combination of a ship having a plurality of normally closed compartments, a deflated captive balloon detachably secured to the closure of the compartment, selective means for opening the door of the compartment and for automatically inflating the balloon to a predetermined pressure when the door is opened, automatic means for releasing the balloon from its support when a predetermined inflating pressure is reached, a reeled tag line associated with the balloon and secured upon its one end to the balloon and upon its oppositely disposed end to the ship and means adapted for unreeling the tag line when the balloon rises.

8. In a device of the class described, the combination of a ship having a plurality of compartments, a door that is normally closed relative to the compartment, acting as a normal closure, a balloon releasably secured to the door and normally sealed relative to the door, manually operated and automatic means for opening the door, means for automatically inflating the balloon, with a fluid that is lighter than air, when the door is opened and automatic means for releasing the balloon, from the door, when a predetermined condition of inflation of the balloon is reached.

9. In a device of the class described, in combination with a ship, a balloon held captive and normally deflated detachably secured to the ship, automatic means for inflating the balloon and releasing the balloon from the ship when the ship is unduly shocked, and means for unreeling the balloon from the ship and for maintaining the same captive, but in spaced relation with the ship when the balloon rises, and means for releasing signals from the balloon when the balloon rises.

10. In a device of the class described, in combination with a ship, balloon compartments disposed in the ship, a door adapted for normally closing the compartment, a balloon sealed to the door and releasable therefrom, automatic means for inflating the balloon when the door is opened, automatic means for releasing the balloon from the door when a predetermined inflation of the balloon is reached and means for unreeling the balloon from the ship and for holding the same in spaced relation with the ship.

11. In a device of the class described, in combination with a compartment of a ship, of a balloon releasably disposed within the compartment, automatic means for inflating the balloon when the compartment is opened, and automatic means for releasing and reeling the balloon from the compartment when a predetermined condition of inflation obtains within the balloon.

12. In a device of the class described, in combination with a compartment of a ship, a deflated balloon releasably disposed within the compartment, automatic means for inflating the balloon to a predetermined pressure when the compartment is opened, a reeled tag line connecting the balloon to the ship and adapted for being unreeled through the buoyant action of the balloon when inflated and means for releasing signals from the balloon.

GEORGE W. PAULSON.